United States Patent [19]

Benoit

[11] Patent Number: 4,674,324

[45] Date of Patent: Jun. 23, 1987

[54] GOLF CLUB SWING-WEIGHTING METHOD

[76] Inventor: William R. Benoit, 336 Pleasant St., Laconia, N.H. 03246

[21] Appl. No.: 617,329

[22] Filed: Jun. 5, 1984

[51] Int. Cl.4 .......................... G01M 1/30; A63B 53/00
[52] U.S. Cl. ....................................... 73/65; 273/77 A
[58] Field of Search .......................... 73/65; 273/77 A

[56] References Cited

U.S. PATENT DOCUMENTS 1,742,394  1/1930  Jacob et al. ............................... 73/65
4,128,242 12/1978  Elkins, Jr. ........................... 273/77 A
4,203,598  5/1980  Stuff et al. ........................... 73/65 X
4,415,156 11/1983  Jorgensen ........................... 273/77 A Primary Examiner—Charles A. Ruehl
Attorney, Agent, or Firm—Traynham, Parnass, & Czeciuk

[57] ABSTRACT

An improved golf club swing weighting method allowing a golf club maker to optimize the design of a set of golf clubs by considering a golfer's preferences relative to moment of inertia and radius of gyration, as well as allowing the center of percussion of each club to be positioned in the clubhead if desired.

14 Claims, 9 Drawing Figures

PRIOR ART

GOLF CLUB SWING-WEIGHTING METHOD

The present invention relates to an apparatus for swing-weighting golf clubs in order to custom fit a set of golf clubs to an individual golfer, taking into account the golfer's preferences relative to the overall weight, center of percussion position, moment of inertia, and radius of gyration of each club.

THE PRIOR ART

It is well known to categorize golf clubs by using a technique known as "swing-weighting". The generally accepted method for swing-weighting a golf club is to place the club on an apparatus which statically balances the club at a point which is either twelve (12) or fourteen (14) inches from the grip end of the club. One scale utilizing the twelve-inch point is known as the "Lorythmic Scale", and the scale based on the fourteen-inch point is referred to as the "Official Scale". A sliding weight mechanism allows the necessary amount of weight to be shifted as necessary in order to balance the club at the twelve- or fourteen-inch point. The amount of weight which must be shifted indicates the "swing-weight" value of each golf club. Typical swing-weight designations tend to vary from "B-0" to "E-9". These designations correspond to various static moment values (measured in "ounce-inches") per the following table:

| Swing-Weight | Official Scale | Lorythmic Scale |
|---|---|---|
| B-0 | 200 | 170 |
| B-1 | 202 | 172 |
| B-2 | 204 | 174 |
| B-3 | 206 | 176 |
| B-4 | 208 | 178 |
| B-5 | 210 | 180 |
| B-6 | 212 | 182 |
| B-7 | 214 | 184 |
| B-8 | 216 | 186 |
| B-9 | 218 | 188 |
| C-0 | 220 | 190 |
| C-1 | 222 | 192 |
| C-2 | 224 | 194 |
| C-3 | 226 | 196 |
| C-4 | 228 | 198 |
| C-5 | 230 | 200 |
| C-6 | 232 | 202 |
| C-7 | 234 | 204 |
| C-8 | 236 | 206 |
| C-9 | 238 | 208 |
| D-0 | 240 | 210 |
| D-1 | 242 | 212 |
| D-2 | 244 | 214 |
| D-3 | 246 | 216 |
| D-4 | 248 | 218 |
| D-5 | 250 | 220 |
| D-6 | 252 | 222 |
| D-7 | 254 | 224 |
| D-8 | 256 | 226 |
| D-9 | 258 | 228 |
| E-0 | 260 | 230 |
| E-1 | 262 | 232 |
| E-2 | 264 | 234 |
| E-3 | 266 | 236 |
| E-4 | 268 | 238 |
| E-5 | 270 | 240 |
| E-6 | 272 | 242 |
| E-7 | 274 | 244 |
| E-8 | 276 | 246 |
| E-9 | 278 | 248 |

One problem with these standard swing-weight scales is that the swing-weight designations (i.e., B-0 to E-9) have a vague and somewhat arbitrary correlation with important dynamic characteristics of golf clubs such as the moment of inertia and the radius of gyration. In addition, the scales disregard the location of the center of percussion of a golf club—in fact, the scales ensure that the center of percussion of the club will never be in the clubhead, which is its optimal location.

OBJECTS OF THE INVENTION

Accordingly, a primary object of the present invention is to provide a golf club swing-weighting method which eliminates or substantially reduces the problems noted above.

A more specific object is to provide a golf club swing-weighting method which provides for precise control of the moment of inertia and radius of gyration of each club so as to optimize the matching of the golf club to the golfer.

Another object is to provide a golf club swing-weighting method which allows for precise control of the center of percussion location for a golf club, including positioning the center of percussion of each club within the volume of the clubhead, or beyond the clubhead.

SUMMARY OF THE PRESENT INVENTION

These objects are achieved by providing a golf club swing-weighting method which essentially comprises a swing-weight scale apparatus, which pivots a golf club about a point approximately 5 inches from the grip end of the club, and taking the following steps: (1) positioning the center of percussion of each club in the volume of the clubhead, or beyond the clubhead; (2) having a golfer select a golf club having a moment of inertia which is optimal for that golfer; (3) entering a graph (static moment vs. pendulum length of club) and selecting a point corresponding to the selected optimal moment of inertia on the graph and drawing a line of constant static moment through that point; (4) balancing each golf club on the swing-weight scale apparatus of the present invention about the five-inch point to obtain the desired static moment; and (5) adjusting the radius of gyration to optimize feel and performance of the golf club. Three possible means for determining the pendulum length of a golf club are also disclosed.

GENERAL DESCRIPTION OF THE DRAWINGS

For a fuller understanding of the nature and objects of the present invention, reference should be had to the following description taken in connection with the accompanying drawings wherein.

DETAILED DESCRIPTION OF THE DRAWINGS

Figure 1A:
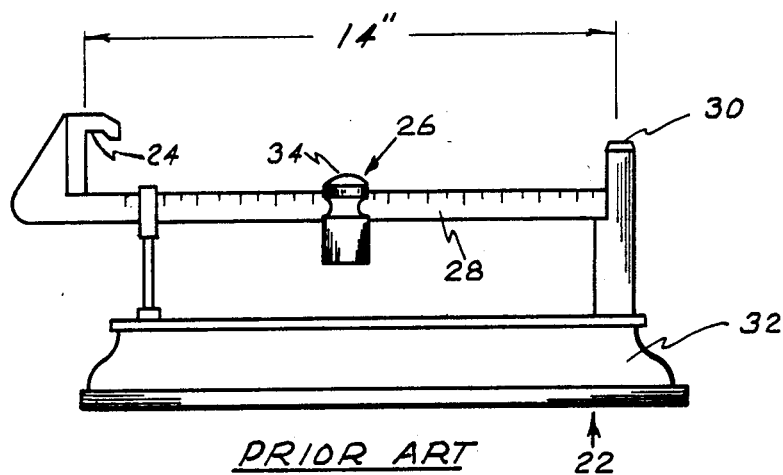
FIG. 1A and 1B illustrate typical prior art swing-weight scale apparatus presently used for most golf clubs.
Figure 1B:
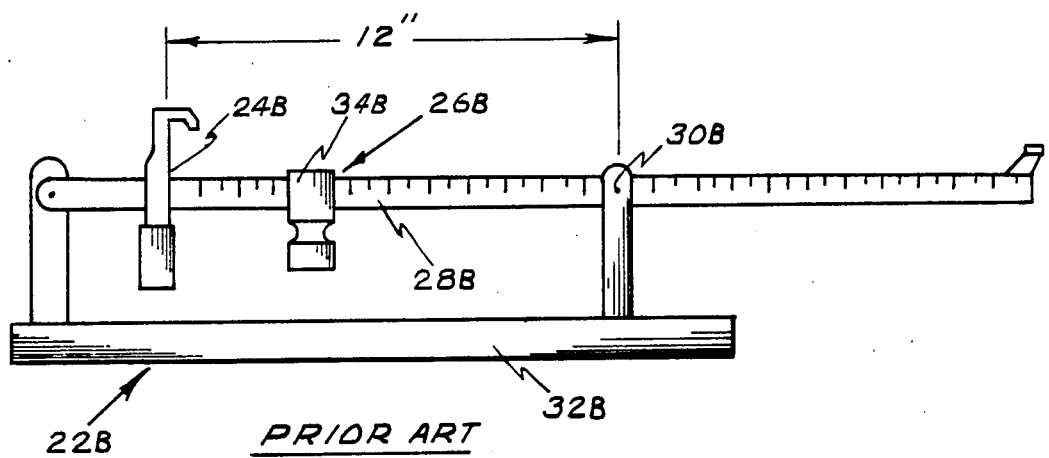

The prior art standard swing-weight scale which is still in use utilizes a balancing apparatus 22 or 22B as shown in FIG. 1A or 1B. Apparatus 22 or 22B comprises a golf club holder 24 or 24B, a weight-shifting mechanism 26 or 26B, a calibrated scale 28 or 28B, a pivot 30 or 30B, and a support base 32 or 32B. A golf club (not shown) is positioned in holder 24 or 24B, and weight 34 or 34B of mechanism 26 or 26B is manipulated from side-to-side until the golf club is balanced. The position of weight 34 or 34B relative to the scale 28 or 28B is then observed to determine the swing-weight designation of the club.

Figure 2:
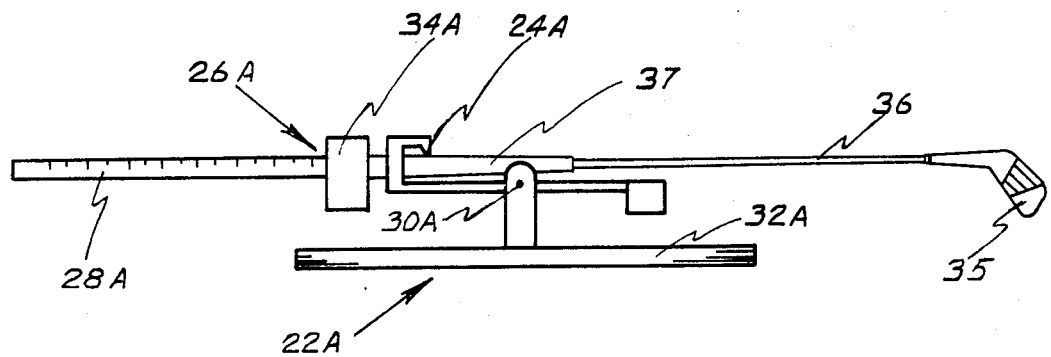
FIG. 2 is a frontal view in elevation of a swing-weight scale apparatus of the present invention.

The preferred embodiment of the present invention is shown in FIG. 2. The golf club balancing apparatus 22A comprises a golf club holder 24A, a weight-shifting mechanism 26A, a weight 34A, a calibrated scale 28A, a pivot 30A, and a base 32A. A golf club 36 is shown positioned in holder 24A in preparation for balancing in accordance with the method of the present invention. Golf club 36 has a clubhead 35 and a grip end 37 as indicated in FIG. 2.

Figure 3:
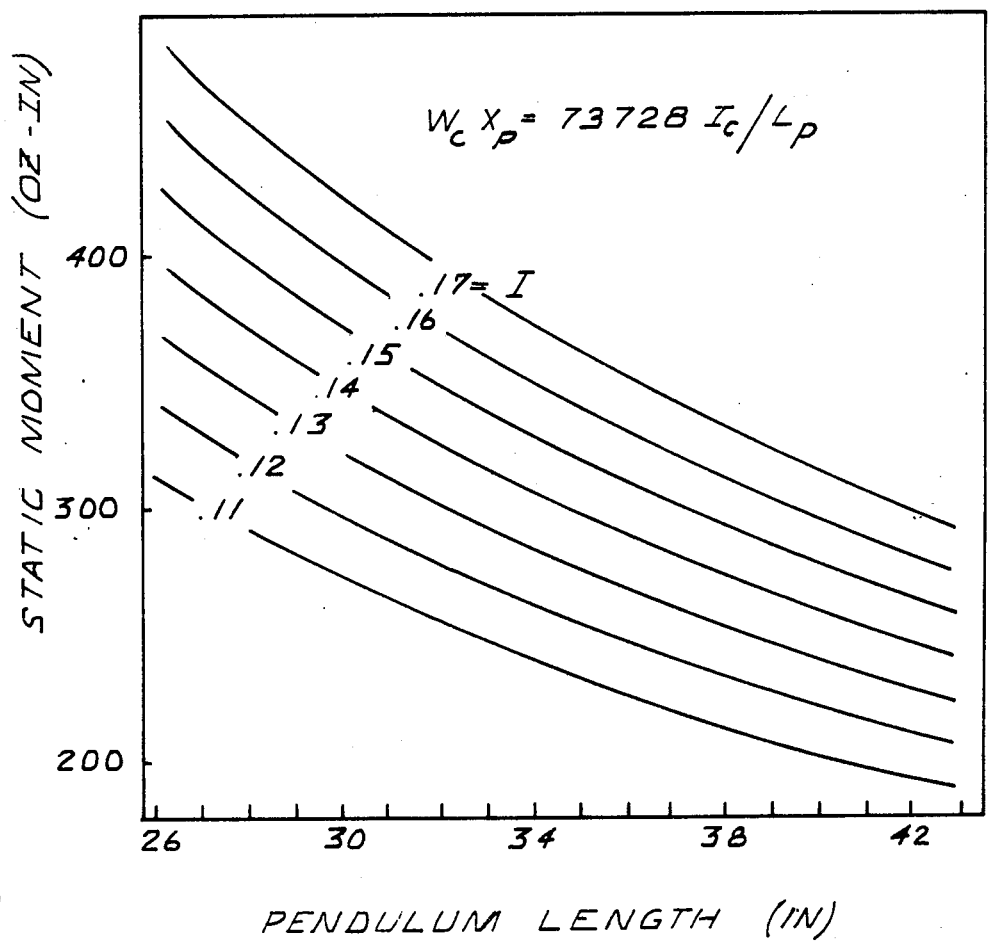
FIG. 3 is a graph of static moment versus pendulum length and having lines of constant moment of inertia superimposed thereon.

Turning now to FIG. 3, a graph is depicted having the pendulum length (in inches) of a golf club on the abscissa and the static moment (in ounce-inches) about the pivot point of the golf club on the ordinate. For purposes of this application, the static moment is defined as the product of the weight of the club ($W_c$) and the distance ($X_p$) between the club's center of gravity and its pivot point.

The pivot point is chosen to be approximately five inches from the grip end of the club 36, since most golfers tend to grip their golf clubs so as to cause the clubs to pivot about a point approximately five inches from the grip end. For an individual golfer who grips the club at some other point (e.g., 5.5 inches from the grip end), the balancing method of the present invention can be modified to balance a golf club about the actual pivot point of that golfer.

The relationship between $X_p$ and $W_c$ relative to the moment of inertia ($I_c$) of the club about the pivot point is defined by the following equation:

$$W_c \cdot X_p = (I_c \cdot K)/(L_p) \tag{1}$$

where $L_p$=equivalent pendulum length of the club and

K=constant conversion factor ensuring proper units

The present invention incorporates the relationships shown in the above equation for use in balancing golf clubs. The improved balancing method is embodied in the following steps:

(1) Each of the golf clubs in the set of clubs which will be balanced are checked to determine the location of the center of percussion of each club. Various methods of making this determination are discussed hereinafter.

(2) Counterweights are added to each club in order to position the center of percussion of each club within the volume of the clubhead, or beyond the clubhead, according to the disclosure in my previous U.S. patent application Ser. No. 593,974 filed on Mar. 27, 1984.

(3) A golfer selects a favorite moment of inertia for a reference golf club. The preferred embodiment of the invention requires that the golfer make the selection for the golf club having the longest shaft—the driver. The reason for preferring the driver is explained hereinafter.

(4) The selected moment of inertia, along with the golf club equivalent pendulum length, is used to enter the graph shown in FIG. 3. The corresponding static moment, measured in ounce-inches, is read off the graph; this value of static moment is then used for all of the remaining golf clubs to be balanced.

(5) Each golf club in the set is balanced on apparatus 22A to ensure that the club has the static moment determined in step (4) above. Weight is added to or subtracted from the center of the clubhead (as close as possible to the center of percussion location) in order to get the desired static moment. An example of the procedure for balancing a golf club is included hereinafter.

(6) The radius of gyration of each golf club is tailored to the individual golfer so as to optimize the flailing action and dynamic characteristics of each club. The preferred method for modifying the radius of gyration of a golf club is described hereinafter.

First of all, the determination of the center of percussion locations is accomplished by determining the equivalent pendulum length of each club in inches. This can be done through calculations by using the following equation:

$$T = 2\pi \sqrt{(L_p)/(g \cdot 12 \text{ inches/ft})} \tag{2}$$

where

T=time (seconds) of a single oscillation
$L_p$=length of equivalent simple pendulum and
g=gravitational constant (32 ft/sec$^2$)

This equation can be manipulated to give the formula for the equivalent pendulum length, $L_p$, as follows:

$$L_p = (T^2 \cdot g \cdot 3 \text{ in/ft})/(\pi^2) \tag{3}$$

Thus, a golf club can be suspended so that it will pivot about the five-inch point, and the period (T) of a single oscillation can be measured. Alternatively, the time for multiple oscillations can be measured and that time divided by the number of oscillations to get an average time (in seconds) for each individual oscillation in order to reduce measurement error. Once the period of a single oscillation has been determined, the equivalent pendulum length of the golf club can be determined by solving equation (3).

Figure 4:
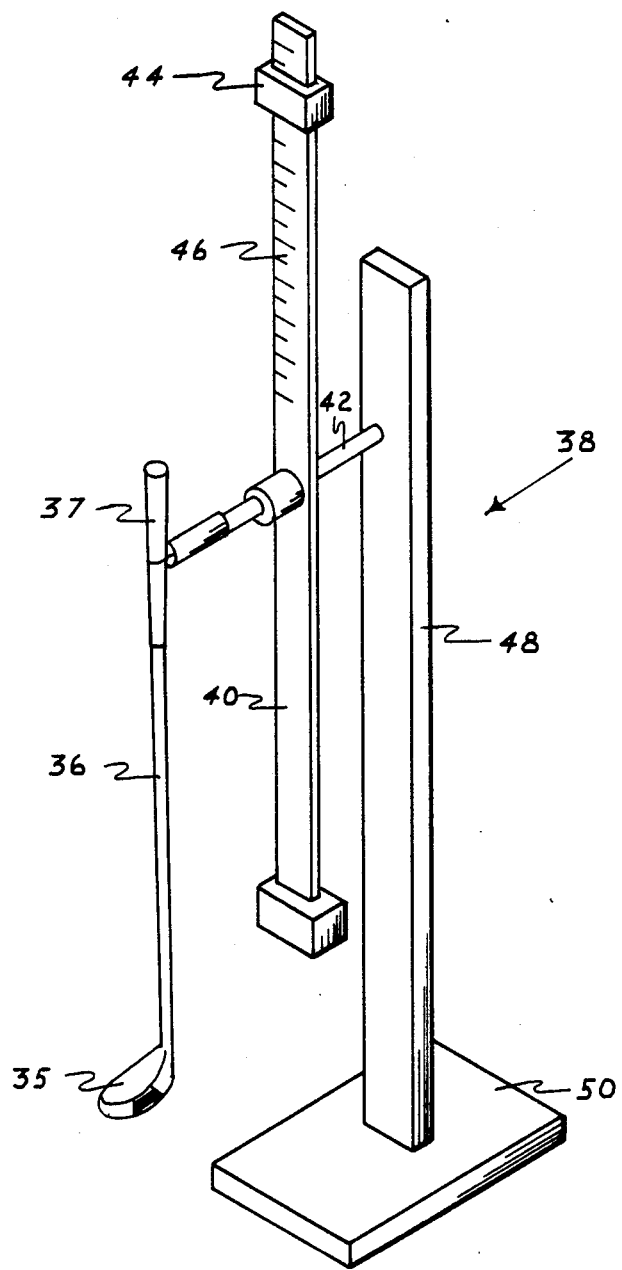
FIG. 4 is a perspective view of an apparatus for measuring the equivalent pendulum length of a golf club.

An even simpler method of determining the equivalent pendulum length of a golf club is to use an apparatus 38 as shown in FIG. 4. Apparatus 38 is used by oscillating a reference pendulum 40 about pivot 42 simultaneously with golf club 36. Adjustable weight 44 is moved up and down scale 46 until club 36 and reference pendulum 40 have the same period of oscillation. Apparatus 38 has a counterweight 39 and a stand 48 which is supported by a base 50. When the periods of club 36 and pendulum 40 have been matched, the equivalent pendulum length of club 36 can be read from the spot on scale 46 corresponding to the position of adjustable weight 44. The equivalent pendulum length corresponds to the location of the center of percussion—for example, if a 43-inch driver has a pendulum length of 38 inches, and the pivot point is at the five-inch point, then the center of percussion is 38 inches below the pivot point. This puts the center of percussion 43 inches from the grip end of the club, which is within the volume of the clubhead. The preferred embodiment of apparatus 38 is shown in FIG. 4, and modifications of the same apparatus are shown in FIGS. 5 and 6.

Figure 5:
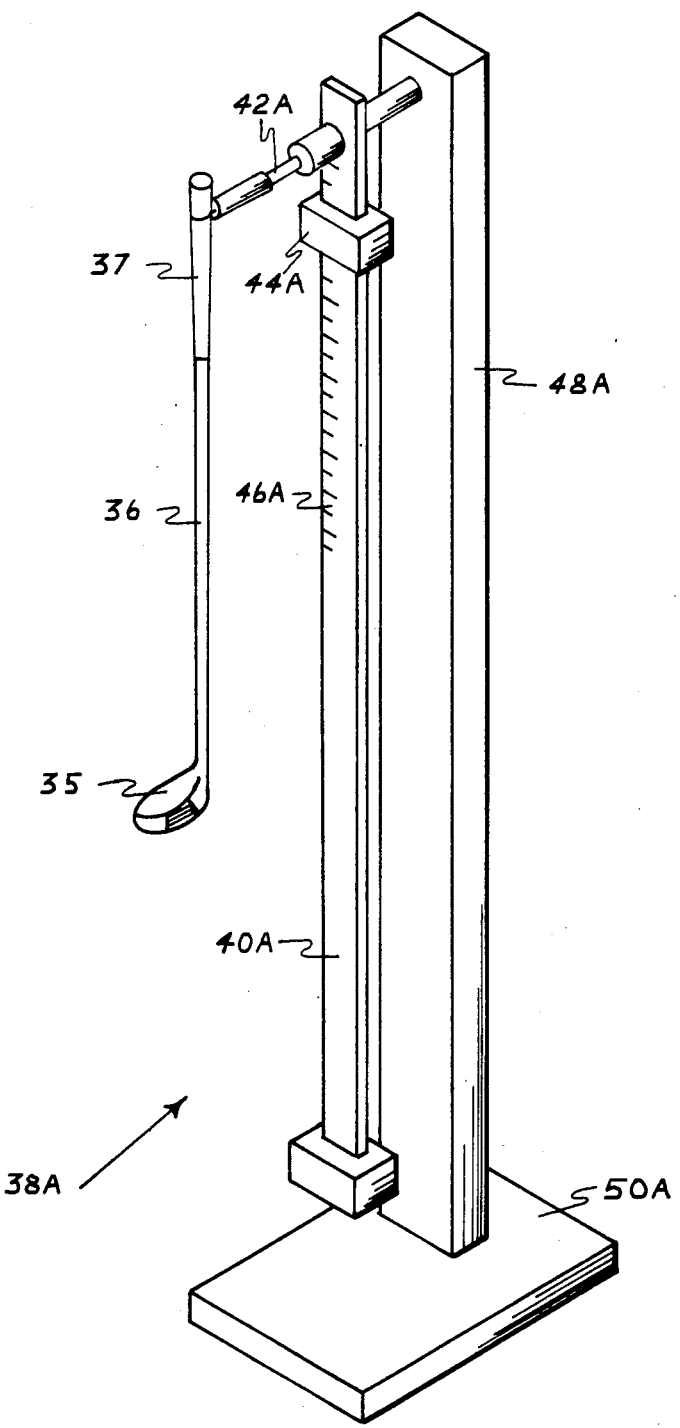
FIG. 5 is a perspective view of a modified apparatus for measuring the equivalent pendulum length of a golf club.

FIG. 5 illustrates a modified apparatus 38A having a counterweight 39A, a reference pendulum 40A, a pivot 42A, an adjustable weight 44A, a calibrated scale 46A, a stand 48A, and a base 50A. Apparatus 38A is used in substantially the same manner as apparatus 38 in FIG. 4.

Figure 6:
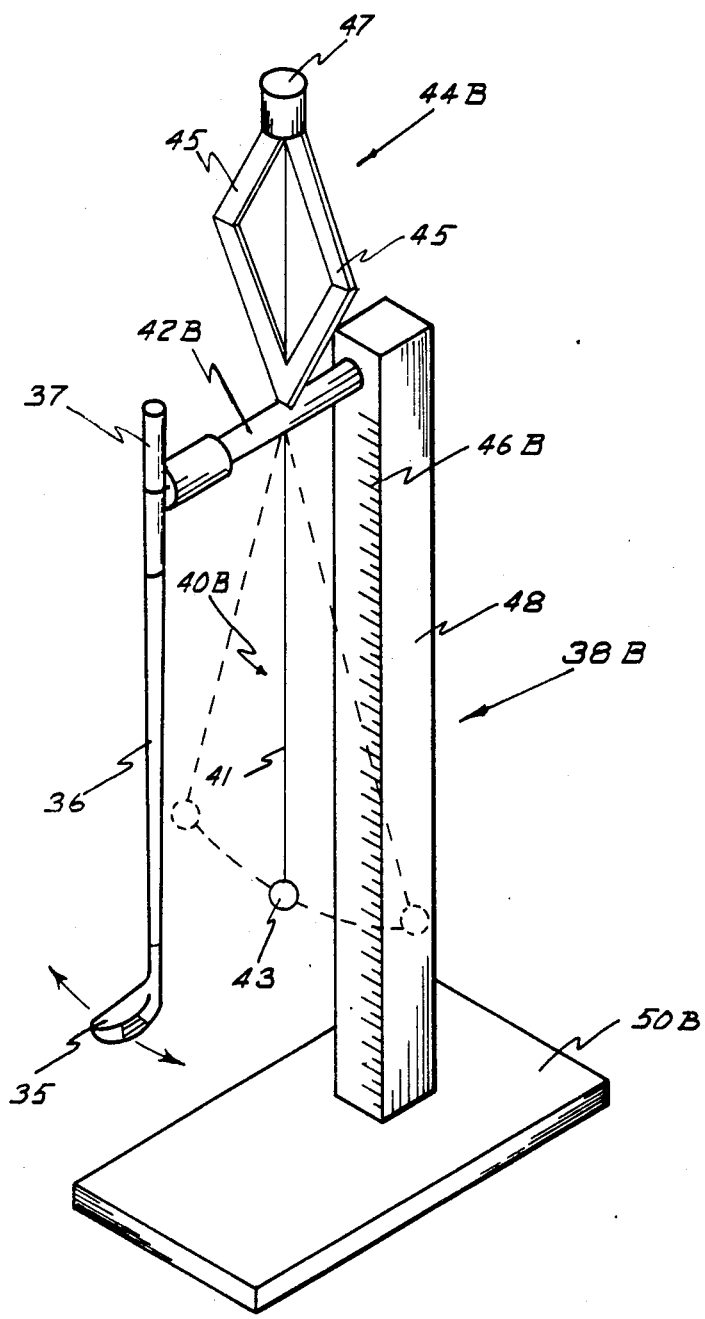
FIG. 6 is a second modification of an apparatus for measuring the equivalent pendulum length of a golf club, shown in perspective.

FIG. 6 shows another modification. Apparatus 38B has a reference pendulum 40B (comprising a string 41 of negligible weight and a weight 43), a pivot 42B, an adjustment mechanism 44B, a calibrated scale 46B, a stand 48B, and a base 50B. The primary difference between apparatus 38 and apparatus 38B is that apparatus 38B has adjustment mechanism 44B rather than an adjustable weight 44 for adjusting the period of the reference pendulum. Mechanism 44B comprises a pair of parallel linkages 45 and an adjustment handle 47. Handle 47 can be moved up or down to raise or lower string 41 and weight 43. Lowering string 41 increases the period and length of reference pendulum 40B, while raising string 41 and weight 43 decreases the period and length. The numerical value of the period is read from scale 46B by marking the point on the scale corresponding to the position of weight 43.

Once the location of the center of percussion of each club has been determined in accordance with one of the methods described above, counterweights (not shown) may be added to the clubs to position the center of percussion in the clubhead (or beyond the clubhead) of each golf club. The location and amount of counterweight to be added to each club is described in detail in my previous U.S. patent application Ser. No. 593,974 filed on Mar. 27, 1984.

The next step entails a subjective evaluation of a golfer's preferred moment of inertia. The preferred embodiment of the present invention requires a golfer to swing the golf club with the longest shaft, the driver, and find the optimal moment of inertia for that club. The optimal moment of inertia is determined by evaluating what "feels" and performs best for that golfer. An important part of this step is to get sufficient data and feedback to ensure that the proper moment of inertia has been chosen. This inventor has discovered through experimentation that decreasing or increasing the moment of inertia through a range of values tends to cause "hooking" or "slicing", respectively, depending on the values tried. A moment of inertia value below some threshold value for a particular golfer will cause hooking, while increasing the moment of inertia will result in straight shots. Further increases in the moment of inertia above a second threshold value for that golfer will cause the golfer to slice. Experimentation by this inventor indicates that each golfer has his or her own unique threshold values for hooking or slicing, as described above. After selecting this optimal moment of inertia, the graph shown in FIG. 3 is entered in order to determine the static moment which corresponds to that moment of inertia and the equivalent pendulum length of the driver. FIG. 3 is a graphic depiction of equation (1) above, where $K = 73728$.

The resulting static moment value is then held constant for the entire set of golf clubs being balanced according to the present invention. Thus, by drawing a straight line of constant static moment through the point corresponding to the pendulum length of the driver and the selected moment of inertia, the decreasing values of moment of inertia for each succeeding club having a pendulum length successively shorter than the driver can be determined from FIG. 3. The reason that the driver is preferred as the reference club while selecting the optimal moment of inertia is that the majority of golfers tend to have problems hitting their longer clubs, i.e., the woods and "long irons" (one-iron through about the four-iron); therefore, having the optimal feel and performance for those clubs is considered to be the priority in golf club improvement efforts, and the moment of inertia value is a critical factor in how a club feels and performs.

Next, each golf club is balanced on apparatus 22A to attain the static moment determined as described above. The balancing procedure is exemplified as follows:

EXAMPLE

Assume that a golf club, a driver, is being balanced. The driver has an overall length of 43 inches. The overall weight of the driver is 12.24 ounces—the shaft is made of graphite and weighs 2.58 ounces, the grip weight is 2.0 ounces, and the weight of the clubhead is 7.66 ounces. This driver has a moment of inertia of about 0.1650 slug-ft$^2$, and would be designated as D-4 on the Official Scale. To position the center of percussion into the clubhead, 2.70 ounces of external counterweight are added to the grip end of the driver. A greater quantity of internal counterweight would be required to move the center of percussion into the clubhead. The overall weight of the driver is now 14.94 ounces, and the center of gravity is located at a point 26.43 inches from the grip end of the club. The static moment is about 320.13 ounce-inches about the five-inch pivot point. The next step in balancing the club is to select a preferred moment of inertia, and enter the graph in FIG. 3. Assume that a moment of inertia of 0.1650 slug-ft$^2$ is too high a value for the golfer in this example and thus causes the golfer to slice the golf ball; therefore, after successive trials, the golfer selects a preferred moment of inertia of 0.1550 slug-ft$^2$. That moment of inertia and pendulum length (43—5=38 inches) results in a static moment of 300.73 ounce-inches. The golf club is then placed on apparatus 22A of the present invention, and weight 34A is moved to the position on scale 28A corresponding to a static moment value of 300.73 ounce-inches. With weight 34A in that position, the apparatus 22A is out-of-balance, indicating that clubhead 35 is too heavy. In order to balance the club, about 0.51 ounces of weight must be removed from clubhead 35 (from the volume around the center of percussion).

Again, this inventor has discovered through experimentation that reducing the radius of gyration below a threshold value for a particular golfer will cause that golfer to hook the golf ball; conversely, increasing the radius of gyration above a second threshold value will cause that golfer to slice the ball. At some radius of gyration value intermediate these two threshold values, that golfer will hit straight shots with the golf club. The original radius of gyration of the club in the above example was 31.53 inches, and the new radius of gyration of the club is 28.14 inches. If the golfer continues slicing the ball at that new radius of gyration value, further steps can be taken in order to further decrease the radius of gyration. Shortening the radius of gyration causes the golf club to feel shorter dynamically, although the actual physical length of the club remains unchanged. Additional shortening of the radius of gyration can be obtained by replacing the external counterweight at the grip end of the golf club with larger weights in the interior of the club shaft between the grip end and the pivot point. The location of these internal weights is selected so as to ensure that the center of percussion remains in the clubhead according to my previous U.S. patent application Ser. No. 593,974 filed on Mar. 7, 1984.

The radius of gyration ($R_g$) is defined by the following equation:

$$R_g = \sqrt{(I_c \cdot K)/(W_c)} \qquad (4)$$

where $I_c$, $W_c$, and K are the same as in equation (1) above.

Figure 7:
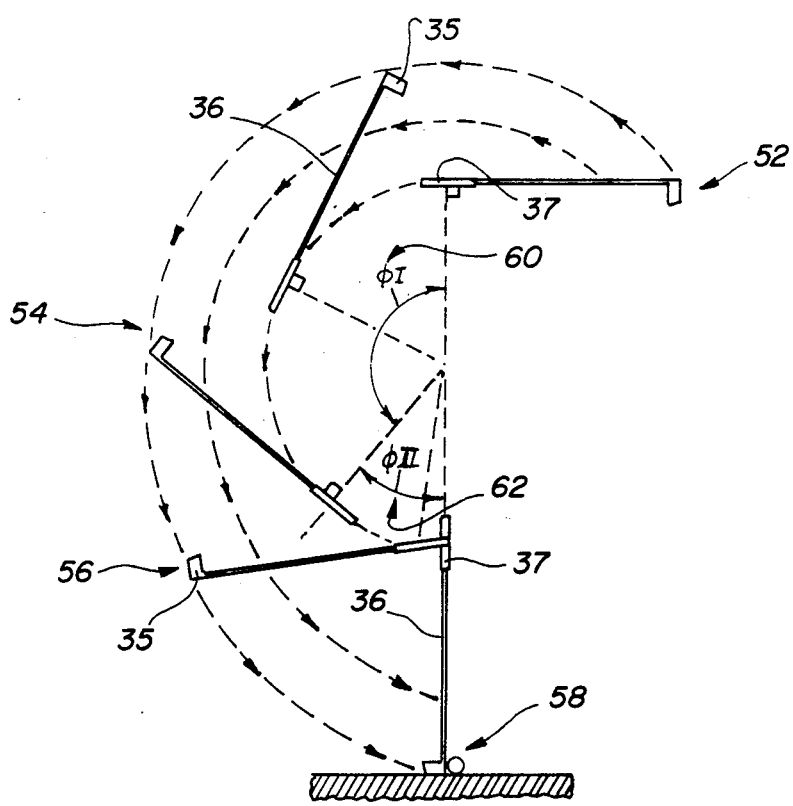
FIG. 7 is a view of a golf club with time sequence positions shown during a golf swing.

The primary advantage of using the balancing method of the present invention is that the balanced golf clubs are more closely matched to a particular golfer relative to dynamic parameters, i.e., moment of inertia and radius of gyration, rather than static parameters only. These parameters relate to a pivot point of the golf club which more accurately reflects the reality of the golf swing. This pivot point is the point about which the club rotates as the golfer swings the club and the club "uncocks" during the swing. FIG. 7 illustrates a typical golf swing. Various phases of the swing include the top of the swing as indicated by numeral 52, the uncocking phase as indicated by numerals 54, and 56, and the terminal point of the uncocking phase, or the point of impact, as indicated by numeral 58. The initial phase of the swing covers the angle and arc indicated by numeral 60, and the uncocking phase of the swing (phase II) covers the angle and arc indicated by numeral 62.

Another advantage of the golf club balancing method of the present invention is that it allows the center of percussion of a golf club to be positioned within the volume of the clubhead, or beyond the clubhead, prior to balancing the club. This predetermination of the center of percussion position has no adverse affect on the subsequent balancing procedure.

A number of variations of the invention described above are possible. For example, as mentioned hereinbefore, the pivot point can be varied from the five-inch position for a golfer who grips a golf club so as to cause the club to pivot about some point other than the five-inch point. If that golfer pivots the club about the four-inch point, for example, then the balancing method can be modified to balance those clubs about the four-inch pivot point rather than the five-inch pivot point referred to throughout this application.

Another variation in the swing-weight balancing method is to balance a set of golf clubs using static moments which are not constant. One alternative is to pick a point on the graph in FIG. 3 for a driver, as described hereinbefore, and a second point corresponding to the equivalent pendulum length of the shortest golf club (e.g., a pitching wedge) and its optimal moment of inertia. A straight line is then drawn between these two points on the graph of FIG. 3, and all of the intermediate clubs are balanced with the static moment values which fall on that straight line. A second alternative method for establishing a curve of static moment values on the graph of FIG. 3 is to select a preferred moment of inertia for each golf club in the set of clubs. This would provide for the ultimate match between the golfer and his golf clubs, since each club would have its own unique value of static moment based on the individual preferences of the golfer. Obviously, this method would take the most time, but it would result in the most customized set of golf clubs possible. The preferred embodiment of the present invention uses the constant static moment method so as to save much of the time involved in matching each individual golf club to the golfer, and so as to give all of the clubs a standardized "feel" due to the constant static moment—this method would seem to be more suitable for mass production techniques. Another way to gain this "standardization" advantage would be to select one preferred moment of inertia for an entire set of clubs and then balance each club in the set to the static moment corresponding to that constant moment of inertia and the equivalent pendulum length of each club.

Figure 8:
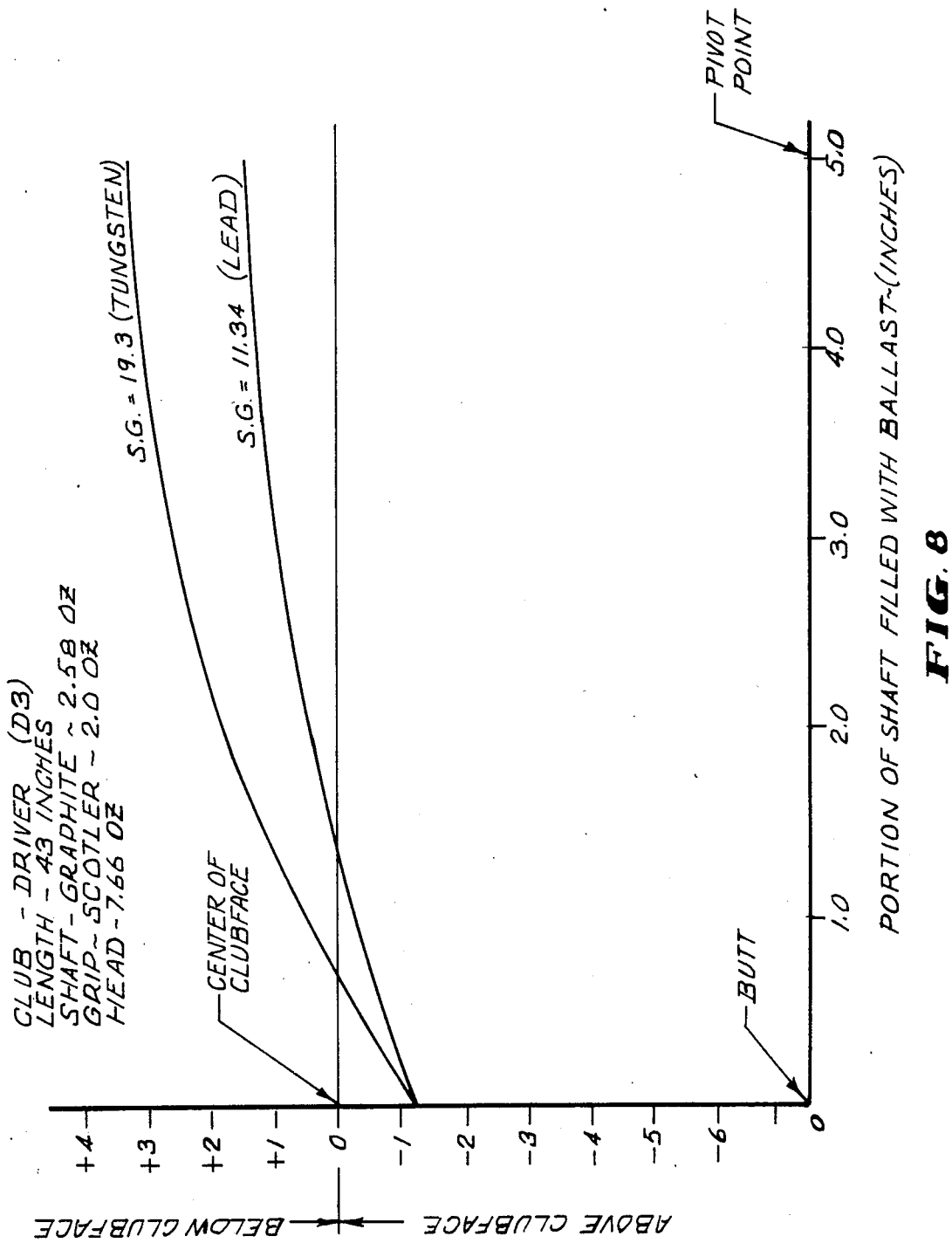
FIG. 8 is a graph showing movement of the center of percussion of a golf club, relative to the center of the face of the clubhead, when a predetermined weight is added to the shaft of the club at various distances from the grip end of the golf club.

A third variation of the golf club swing-weight balancing method of the present invention involves adjustments of the radius of gyration of each golf club in a set of clubs. As briefly described above, the radius of gyration can be increased or decreased in several ways. The preferred embodiment of the present invention is to vary the radius of gyration so that the position of the center of percussion of a club remains in the clubhead. This can be done with an external counterweight or a relatively heavier internal counterweight located between the grip end of the club and the pivot point. The closer the internal weight is positioned near the pivot point, the greater the quantity of counterweight that is required in order to get the center of percussion into the clubhead. Another alternative way to vary the radius of gyration is to increase or decrease the radius of gyration without regard to the center of percussion location. FIG. 8 illustrates how the center of percussion position varies relative to the center of the clubface when various weights are added to the shaft of a golf club at various distances from the grip end of the club. Curve 8A plots the relative positions for an added weight of one ounce, while curve 8B plots the relative positions for an added weight of two ounces. Note that the maximum degradation of the center of percussion position out of the clubhead occurs when the one-ounce weight and two-ounce weight are added to the shaft at positions 22 inches from the grip end and 23 inches from the grip end, respectively. When the radius of gyration is altered by adding weights to the shaft so as to move the center of percussion out of the clubhead, the moment of inertia is also altered by the change in the radius of gyration. The moment of inertia can be restored to its original preferred value by removing a corresponding amount of weight from the clubhead of the golf club. This results in a different static balance for this golf club than for the preferred embodiment, but the dynamic characteristics (i.e., moment of inertia and radius of gyration) have the same values as for a golf club balanced according to to the present invention. It should be noted that this fact is of utmost importance to someone attempting to match a set of golf clubs dynamically. The following table illustrates three possible variations of weight distributions for a golf club (driver) having a moment of inertia ($I_c$) of 0.1550, a radius of gyration ($R_g$) of 28.14, a total club weight of 14.43 ounces, a 43-inch club length, and a pivot point 5 inches from the grip end of the club. A weight (Weight #1) is added to the shaft of the driver at various points as delineated in the table. A second weight (Weight #2) is added to Variation 3 only.

Note that although only three possible variations are shown, there is an infinite number of alternatives available for a golf club having a predetermined dynamic characteristics (i.e., $I_c$ and $R_g$).

The table follows:

|  | Preferred Embodiment | Variation 1 | Variation 2 | Variation 3 |
|---|---|---|---|---|
| Head weight (oz.) | 7.15 | 7.05 | 6.36 | 6.40 |
| Weight #1 (oz.) | 2.70 | 2.80 | 3.49 | 2.00 |
| Location Wt. #1 (in. from grip end) | 0 | 12 | 23 | 12 |
| Weight #2 (oz.) | 0 | 0 | 0 | 1.45 |
| Location Wt. #2 (in. from grip end) | — | — | — | 31 |
| Center of gravity (in. from grip end) | 25.84 | 27.87 | 29.05 | 28.39 |
| $L_p$ (in.) | 38.00 | 34.63 | 32.93 | 33.86 |

Although having the center of percussion outside the clubhead tends to result in a degraded impact between the golf ball and the clubhead, any resultant pulses and undesired vibrations can be damped out in various manners. Having the counterweight positioned inside the club shaft between the clubhead and the golfer's hands will allow the counterweight to serve a dampening function. In addition, it is possible to construct a golf club with one or more couplings built into the shaft between the clubhead and the golfer's hands so that the coupling(s) serve to dampen any pulsing or vibratory effects.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An improved method for balancing a set of golf clubs, each of said clubs having a pivot point about which said club rotates during the uncocking phase of the golf swing, comprising the following steps:
   (1) having a golfer select a preferred moment of inertia for a reference golf club having a predetermined equivalent pendulum length;
   (2) determining a preset value of static moment corresponding to said moment of inertia and said equivalent pendulum length;
   (3) determining the equivalent pendulum length of each golf club in said set so as to locate the center of percussion position of each of said clubs;
   (4) adding a counterweight to each golf club in said set so as to control the position of the center of percussion of each of said clubs;
   (5) balancing each of said golf clubs so as to give each of said clubs the same static moment about said pivot point; and
   (6) adjusting the radius of gyration of each of said golf clubs so as to improve the performance of each of said clubs and to cause said center of percussion to remain in its original position.

2. An improved method for balancing a set of golf clubs according to claim 1, wherein said reference golf club used for selecting a preferred moment of inertia is a driver.

3. An improved method for balancing a set of golf clubs according to claim 1, wherein said reference golf club used for selecting a preferred moment of inertia is the longest of said clubs.

4. An improved method for balancing a set of golf clubs, each of said clubs comprising a shaft having a grip end at a first end of said shaft and a clubhead at a second end of said shaft and each of said clubs having a pivot point about which said club rotates during the uncocking phase of the golf swing, comprising the following steps:
   (1) selecting a first preferred moment of inertia for said the longest of said clubs, said longest club having a first pendulum length;
   (2) balancing said longest club so as to give said club a first static moment about said pivot point corresponding to said first pendulum length and said first preferred moment of inertia;
   (3) selecting a second preferred moment of inertia for said the shortest of said clubs, said shortest club having a second pendulum length;
   (4) balancing said shortest club so as to give said club a second static moment about said pivot point corresponding to said second pendulum length and said second preferred moment of inertia; and
   (5) balancing the remainder of said golf clubs so as to give each of said clubs a static moment about said pivot point that is linearly interpolated between said first and second static moments.

5. An improved method for balancing a set of golf clubs according to claim 4, further comprising the step of adjusting the radius of gyration of each of said golf clubs so as to improve the performance of each of said clubs.

6. An improved method for balancing a set of golf clubs according to claim 5, wherein said moment of inertia for each of said clubs remains unchanged.

7. An improved method for balancing a set of golf clubs according to claim 6, further comprising the step of adding a counterweight to said grip end of each golf club in said set so as to control the position of the center of percussion of each club.

8. An improved method for balancing a set of golf clubs according to claim 7, wherein each of said clubs has a pendulum length which places the center of percussion within the volume of said clubhead of each of said clubs, or beyond said clubhead of each of said clubs.

9. An improved method for balancing a set of golf clubs, each of said clubs comprising a shaft having a grip end at a first end of said shaft and a clubhead at a second end of said shaft and each of said clubs having a pivot point about which said club rotates during the uncocking phase of the golf swing, comprising the following steps:

(1) determining an equivalent pendulum length of each golf club in said set so as to locate the center of percussion position of each of said clubs;

(2) adding a counterweight to each of said golf clubs in said set so as to control the position of the center of percussion of each of said clubs;

(3) selecting a preferred moment of inertia for said set of clubs;

(4) balancing said clubs so that each of said clubs has a moment of inertia equal to said preferred moment of inertia; and (5) adjusting the radius of gyration of each of said golf clubs so as to improve the performance of each of said clubs, while holding the moment of inertia constant and fixing said center of percussion in its original position.

10. An improved method for balancing a set of golf clubs according to claim 9, wherein said center of percussion is located in said clubhead or beyond said clubhead.

11. An apparatus for measuring the pendulum length of a golf club, said apparatus comprising in combination:

a base for supporting said apparatus;
a stand affixed to said base;
a pivot member attached to said stand so as to allow a golf club to be rotatably attached to said pivot member;
a reference pendulum rotatably attached to said pivot member;
means for adjusting the pendulum length of said reference pendulum; and
a calibrated scale for determining the equivalent simple pendulum length of said golf club.

12. An apparatus for measuring the pendulum length of a golf club according to claim 11, wherein said means for adjusting pendulum length comprises an adjustable weight slidably attached to said reference pendulum.

13. An apparatus for measuring the pendulum length of a golf club according to claim 12, wherein said calibrated scale is affixed to said reference pendulum.

14. An apparatus for measuring the pendulum length of a golf club according to claim 11, wherein said means for adjusting pendulum length comprises a simple pendulum mechanism comprising in combination:

a string-like member having negligible weight;
a weight attached to the lower end of said string-like member; and
means for adjusting the physical length of said string-like member.

* * * * *